(12) United States Patent
Hill et al.

(10) Patent No.: US 11,662,562 B2
(45) Date of Patent: May 30, 2023

(54) BROADBAND ILLUMINATION TUNING

(71) Applicant: KLA Corporation, Milpitas, CA (US)

(72) Inventors: Andrew V. Hill, Berkeley, CA (US); Avi Abramov, Haifa (IL); Amit Shaked, Karkur (IL); Valery Garmider, Migdal Ha'emek (IL)

(73) Assignee: KLA Corporation, Milpitas, CA (US)

( * ) Notice: Subject to any disclaimer, the term of this patent is extended or adjusted under 35 U.S.C. 154(b) by 237 days.

(21) Appl. No.: 17/076,312

(22) Filed: Oct. 21, 2020

(65) Prior Publication Data

US 2021/0247601 A1 Aug. 12, 2021

Related U.S. Application Data

(60) Provisional application No. 62/971,982, filed on Feb. 9, 2020.

(51) Int. Cl.
*G02B 21/00* (2006.01)

(52) U.S. Cl.
CPC ..... *G02B 21/0064* (2013.01); *G02B 21/0032* (2013.01); *G02B 21/0048* (2013.01); *G02B 21/0068* (2013.01)

(58) Field of Classification Search
CPC ........... G02B 21/0064; G02B 21/0032; G02B 21/0048; G02B 21/0068
See application file for complete search history.

(56) References Cited

U.S. PATENT DOCUMENTS

| 4,618,759 A * | 10/1986 | Muller | B23K 26/043 219/121.75 |
| 2002/0143506 A1 * | 10/2002 | DAligny | G01B 11/002 703/6 |
| 2002/0191294 A1 * | 12/2002 | Duggan | G02B 6/29395 359/578 |
| 2003/0123119 A1 * | 7/2003 | Morozov | G02B 6/2937 250/234 |
| 2009/0109561 A1 * | 4/2009 | Cook | G02B 26/0816 359/857 |

(Continued)

OTHER PUBLICATIONS

PCT International Search Report and Written Opinion for International Application No. PCT/US2021/015975 dated May 25, 2021, 9 pages.

*Primary Examiner* — William R Alexander
*Assistant Examiner* — Sharrief I Broome
(74) *Attorney, Agent, or Firm* — Suiter Swantz pc llo

(57) ABSTRACT

A tunable filter may include an input focusing optic, an output focusing optic, a linearly-varying filter located at a back focal plane of the input focusing optic and a front focal plane of the output focusing optic, an input angular scanning component located at a front focal plane of the input focusing optic configured to receive an input beam, and an output angular scanning component located at a back focal plane of the output focusing optic. The input focusing optic may receive the input beam from the input angular scanning component and direct the input beam to the linearly-varying filter, where a position of the input beam on the linearly-varying filter is selectable based on an angle of the input angular scanning component. The output focusing optic may receive a filtered beam from the linearly-varying filter and direct the filtered beam to the output angular scanning component.

32 Claims, 9 Drawing Sheets

(56) References Cited

U.S. PATENT DOCUMENTS

2015/0168713 A1* 6/2015 Nowatzyk ............ A61B 3/1025
          359/201.2
2018/0052099 A1* 2/2018 Hill ........................ G01J 3/10
2018/0059407 A1* 3/2018 Kume ................ G02B 26/0816

* cited by examiner

BROADBAND ILLUMINATION TUNING

CROSS-REFERENCE TO RELATED APPLICATION

The present application claims the benefit under 35 U.S.C. § 119(e) of U.S. Provisional Application Ser. No. 62/971,982 filed Feb. 9, 2020, entitled BROADBAND LASER TUNING, which is incorporated herein by reference in the entirety.

TECHNICAL FIELD

The present disclosure relates generally to tuning of broadband illumination sources and, more particularly, to fast tuning of coherent broadband illumination sources using scanning optics and linearly varying filters.

BACKGROUND

Tunable light sources may provide illumination tuned to one or more select wavelengths within a given spectral range. However, typical tunable light sources may suffer from a limited capacity to quickly and precisely modify the intensity or spectrum of a tuned illumination beam. Further, typical external tunable filters may suffer from slow tuning speeds, limited spectral bandwidth, or limited polarization requirements. Therefore, it would be desirable to provide a system and method for curing defects such as those of the identified above.

SUMMARY

A tunable filter is disclosed in accordance with one or more illustrative embodiments of the present disclosure. In one illustrative embodiment, the tunable filter includes an input focusing optic. In another illustrative embodiment, the tunable filter includes an output focusing optic. In another illustrative embodiment, the tunable filter includes a linearly-varying filter, where filtering parameters of the linearly-varying filter differ based on spatial position on the linearly-varying filter. In another illustrative embodiment, the linearly-varying filter is located at a back focal plane of the input focusing optic and a front focal plane of the output focusing optic. In another illustrative embodiment, the tunable filter includes an input angular scanning component located at a front focal plane of the input focusing optic to receive an input beam, where the input focusing optic receives the input beam from the input angular scanning component and directs the input beam to the linearly-varying filter. In another illustrative embodiment, a position of the input beam on the linearly-varying filter is selectable based on an angle of the input angular scanning component. In another illustrative embodiment, the tunable filter includes an output angular scanning component located at a back focal plane of the output focusing optic, where the output focusing optic receives the input beam from the linearly-varying filter as a filtered beam and directs the filtered beam to the output angular scanning component. In another illustrative embodiment, the output angular scanning component provides the filtered beam as an output beam along an output path selectable based on an angle of the output angular scanning component.

A system is disclosed in accordance with one or more illustrative embodiments of the present disclosure. In one illustrative embodiment, the system includes two or more tunable filters. In another illustrative embodiment, a tunable filter of the two or more tunable filters includes an input focusing optic. In another illustrative embodiment, a tunable filter of the two or more tunable filters includes an output focusing optic. In another illustrative embodiment, a tunable filter of the two or more tunable filters includes a linearly-varying filter, where filtering parameters of the linearly-varying filter differ based on spatial position on the linearly-varying filter, and where the linearly-varying filter is located at a back focal plane of the input focusing optic and a front focal plane of the output focusing optic. In another illustrative embodiment, a tunable filter of the two or more tunable filters includes an input angular scanning component located at a front focal plane of the input focusing optic to receive an input beam, where the input angular scanning component receives the input beam from the input focusing optic and directs the input beam to the linearly-varying filter. In another illustrative embodiment, a position of the input beam on the linearly-varying filter is selectable based on an angle of the input angular scanning component. In another illustrative embodiment, a tunable filter of the two or more tunable filters includes an output angular scanning component located at a back focal plane of the output focusing optic, where the output focusing optic receives the input beam from the linearly-varying filter as a filtered beam and directs the filtered beam to the output angular scanning component. In another illustrative embodiment, the output beam of all but a last of the two or more tunable filters is an input beam of a following tunable filter of the two or more tunable filters.

An illumination system is disclosed in accordance with one or more illustrative embodiments of the present disclosure. In one illustrative embodiment, the illumination system includes an illumination source to generate an input beam. In another illustrative embodiment, the illumination system includes a filtering sub-system including two or more tunable filters. In another illustrative embodiment, a tunable filter of the two or more tunable filters includes an input focusing optic. In another illustrative embodiment, a tunable filter of the two or more tunable filters includes an output focusing optic. In another illustrative embodiment, a tunable filter of the two or more tunable filters includes a linearly-varying filter, where filtering parameters of the linearly-varying filter differ based on spatial position on the linearly-varying filter, and where the linearly-varying filter is located at a back focal plane of the input focusing optic and a front focal plane of the output focusing optic. In another illustrative embodiment, a tunable filter of the two or more tunable filters includes an input angular scanning component located at a front focal plane of the input focusing optic to receive an input beam, where the input focusing optic receives the input beam from the input angular scanning component and directs the input beam to the linearly-varying filter, and where a position of the input beam on the linearly-varying filter is selectable based on an angle of the input angular scanning component. In another illustrative embodiment, a tunable filter of the two or more tunable filters includes an output angular scanning component located at a back focal plane of the output focusing optic, where the output focusing optic receives the input beam from the linearly-varying filter as a filtered beam and directs the filtered beam to the output angular scanning component. In another illustrative embodiment, the input angular scanning component of the first of the two or more tunable filters is an input angular scanning component of the filtering sub-system and receives illumination from the illumination source as the input beam. In another illustrative embodiment, the output beam of all but a last of the two or more tunable filters is an input beam of a following tunable filter of the two or more tunable filters. In another illustrative embodiment, the output angular scanning component of the last of the two or more tunable filters is an output angular scanning component of the filtering sub-system.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1A:
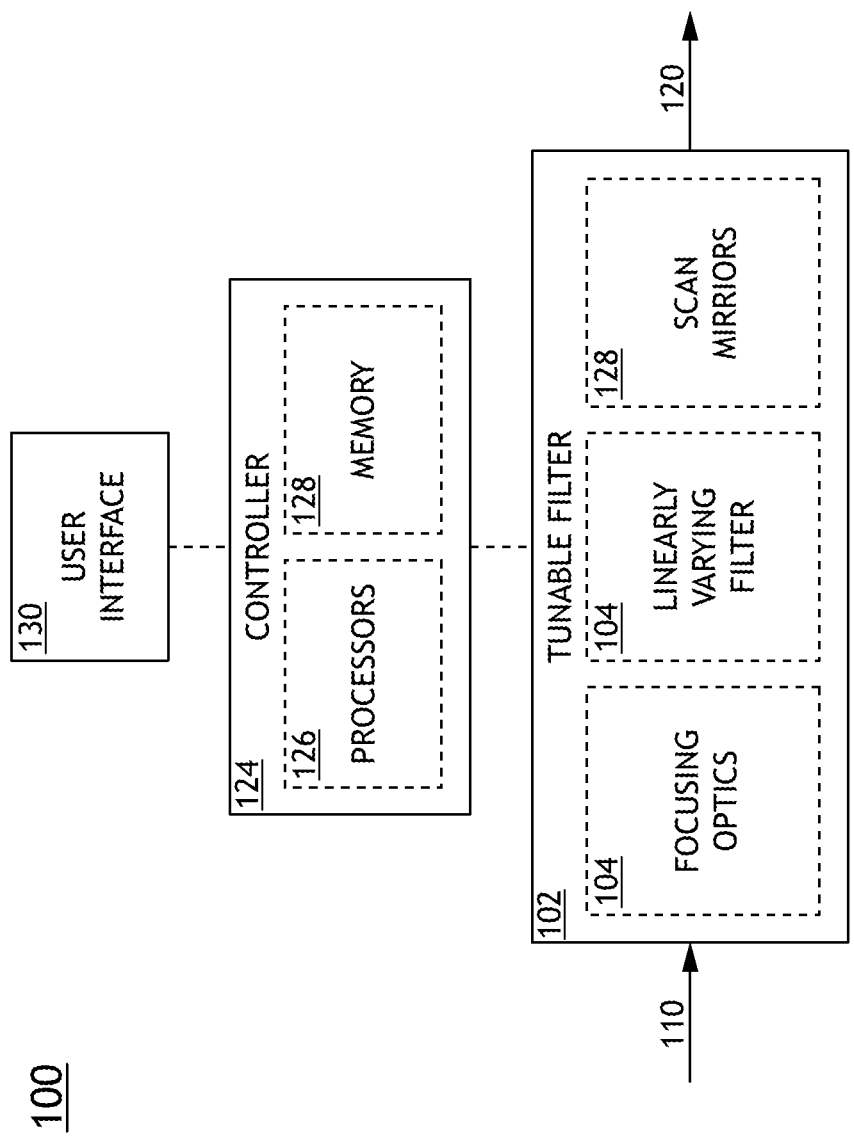
FIG. 1A is a schematic view of a tunable filtering system in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for rapid and flexible tuning of various properties of a broadband illumination source using linearly-varying filters and scanning optics. Linearly-varying filters may include filters having filtering properties that vary along a linear filtering direction. For example, a linearly-varying neutral density filter may provide varying amounts of broadband intensity reduction based on spatial position of an input beam along the linear axis. By way of another example, a linearly-varying low-pass (or high-pass) filter may provide low-pass filtering with a cutoff wavelength that varies based on the spatial position of the input beam along the linear filtering direction. By way of another example, a linearly-varying filter may be formed as a polarizer, where the direction of polarization passed by the linearly-varying filter may differ at different directions along the linear filtering direction. It is contemplated herein that the systems and methods disclosed herein may utilize linearly-varying filters that modify any selected property of an input beam.

In one embodiment, a tunable filter includes a pair of focusing mirrors (e.g., an input focusing mirror and an output focusing mirror) in a 4-f configuration, a linearly-varying filter in a pupil plane (e.g., a back focal planes of an input focusing mirror and a front focal plane of an output focusing mirror), and angular scanning components at the other focal planes of the focusing mirrors. For example, a collimated input beam may be incident on an input tilting mirror, be directed to the input focusing mirror at a selected angle by the input tilting mirror, be focused on the linearly-varying filter at a selected position based on the selected angle, be collimated again by the output focusing mirror, and be directed along any selected output angle by the output tilting mirror. In this configuration, the position of the input beam on the linearly-varying filter, and thus the effect of the linearly-varying filter on the input beam, may be selected by controlling the angle of the input angular scanning component. Further, the output focusing mirror will direct the filtered input beam (e.g., the filtered beam) to the output angular scanning component regardless of the selected angle of the input angular scanning component. Accordingly, the angles of the input and output angular scanning components may be co-selected to direct the filtered beam along any selected path.

Additional embodiments of the present disclosure are directed to stacking multiple tunable filters to provide for tuning of multiple parameters of the input beam. In this way, multiple tunable filters, each having different linearly-varying filters, may be arranged in series to sequentially filter the input beam. For example, a stack of tunable filters may include one or more tunable filters with linearly-varying neutral density filters for power (or intensity) control and one or more tunable filters with linearly-varying spectral filters for spectral control. In one embodiment, the output angular scanning component of a first tunable filter may operate as the input angular scanning component of a second tunable filter. In another embodiment, each tunable filter may have separate input and output tunable filters.

Additional embodiments of the present disclosure are directed to simultaneous filtering and channel selection. It is contemplated herein that a tunable filter as disclosed herein may provide for selection of input or output sources in addition to filtering. For example, two or more input sources may be positioned provide two or more input beams to an input angular scanning component of a tunable filter. In this configuration, the input and/or the output angular scanning components may be configured to direct an input beam from a selected input source through a selected position on a linearly-varying filter in the tunable filter and out as a filtered beam along a selected output beam path. By way of another example, the output angular scanning component may direct a filtered beam along any of two or more output beam paths.

Additional embodiments of the present disclosure are directed to speckle reduction using a filtered beam from a tunable filter. In one embodiment, the output angular scanning component may be controlled to scan a filtered beam around a selected angular range to mitigate speckle associated with a coherent filtered beam. For example, the output angular scanning component may scan the filtered beam along an input face of a fiber to reduce or eliminate speckle associated with illumination of a sample with the filtered beam from an output face of the fiber.

Referring now to FIGS. 1A-4B, systems and methods for tunable filtering are disclosed in greater detail in accordance with one or more embodiments of the present disclosure.

FIG. 1A is a schematic view of a tunable filtering system 100 in accordance with one or more embodiments of the present disclosure.

In one embodiment, the tunable filtering system 100 includes at least one tunable filter 102. A tunable filter 102 may include a pair of focusing optics 104 (e.g., an input focusing optic 104a and an output focusing optic 104b), a linearly-varying filter 106 located at a pupil plane (e.g., the back focal plane of the input focusing optic 104a and the front focal plane of the output focusing optic 104b), and angular scanning components 108 located at the other focal planes of the focusing optics 104. For instance, an input angular scanning component 108a may be located at a front focal plane of the input focusing optic 104a and an output angular scanning component 108b may be located at the back focal plane of the output focusing optic 104b.

The tunable filter 102 may accept any input beam 110 having any spectral wavelength or range of wavelengths. For example, the input beam 110 may include, but is not limited to, wavelengths in extreme ultraviolet, ultraviolet, visible, and/or infrared spectral regions. Further, the input beam 110 may be generated by any suitable illumination source (or combination of sources) including, but not limited to, a narrowband laser source, a supercontinuum laser source, a light-emitting diode (LED), laser-driven plasma source, or a lamp source. Additionally, the input beam 110 may include light from multiple illumination sources propagating along a common input path. For example, the input beam 110 may include light from a supercontinuum laser source and one or more additional illumination sources to supplement the spectrum of the supercontinuum laser. In one embodiment, the input beam 110 includes light from a supercontinuum laser source and a laser diode with a spectrum including 405 nm to supplement the spectrum of the supercontinuum laser.

A linearly-varying filter 106 may include any type of filter for which the amplitude or effect of the filtering varies along a linear filtering direction. In this regard, the impact of the linearly-varying filter 106 on an input beam 110 may vary (e.g., may be tuned) based on the spatial position of the input beam 110 on the linearly-varying filter 106. In one embodiment, a linearly-varying filter 106 includes a neutral density filter. For example, a linearly-varying filter 106 may provide varying amounts of broadband intensity reduction based on the spatial position of the input beam 110 along the linear filtering direction. In another embodiment, a linearly-varying filter 106 includes a spectral filter. For example, a linearly-varying filter 106 configured as an edge filter (e.g., a low-pass filter or a high-pass filter) may provide a varying cutoff wavelength based on the spatial position of the input beam 110 on the linearly-varying filter 106. By way of another example, at least one of a width or a center wavelength of a band-pass or band-reject filter may vary based on the spatial position of the input beam 110 on the linearly-varying filter 106. By way of another example, a linearly-varying filter 106 may be formed as a polarizer, where the direction of polarization passed (e.g., transmitted) by the linearly-varying filter may differ at different directions along the linear filtering direction. By way of another example, a linearly-varying filter 106 may include one or more waveplates, where a thickness varies along the linear filtering direction.

Further, the filtering properties of a linearly-varying filter 106 may vary in any manner along the linear filtering direction. In one embodiment, the filtering properties vary continuously along the filtering direction such that the properties of the input beam 110 may be finely tuned through small adjustments of the spatial position of the input beam 110 on the linearly-varying filter 106. For example, linearly-varying filter 106 providing intensity of spectral control may be well-suited for, but are not limited to, providing continuously varying filtering properties. However, the linear filtering direction need not be monotonic or continuous. In another embodiment, the linearly-varying filter 106 includes one or more discrete sections having discrete properties. In this configuration, the input beam 110 may be directed to any discrete locations to provide discrete filtering. For example, a linearly-varying filter 106 may include discrete sections providing discrete polarization pass directions, waveplate configurations, or the like.

Additionally, a linearly-varying filter 106 may provide variations of multiple properties (e.g., intensity and spectrum) as a function of position along the linear filtering direction such that a linearly-varying filter 106 may be generally understood as providing any desired filtering properties as a function of position along the linear filtering direction.

The focusing optics 104 may include any type of optical elements known in the art and may be selected based on an expected spectrum of the input beam 110. In one embodiment, at least one of the focusing optics 104 includes a reflective optical element. In this regard, the focusing optic 104 may be suitable for broadband and/or UV applications. For example, a focusing optic 104 may include, but is not limited to, a parabolic mirror, or an elliptical mirror. In another embodiment, at least one of the focusing optics 104 includes a reflective optical element. For example, a focusing optic 104 may include, but is not limited to, a refractive scan lens.

The focusing optics 104 may have any selected focal lengths. Further, the focusing optics 104 may have, but are not required to have, the same focal lengths. In the case where the focusing optics 104, the tunable filter 102 may expand or contract a diameter of the input beam 110 based on a ratio of the focal lengths.

The angular scanning components 108 may include any type of adjustable mirror providing adjustable tip and/or tilt including, but not limited to Galvanometer mirrors, acousto-optic deflectors, electro-optic deflectors, polygon scanners, or micro-electro-mechanical systems (MEMS) deflector.

Figure 1B:
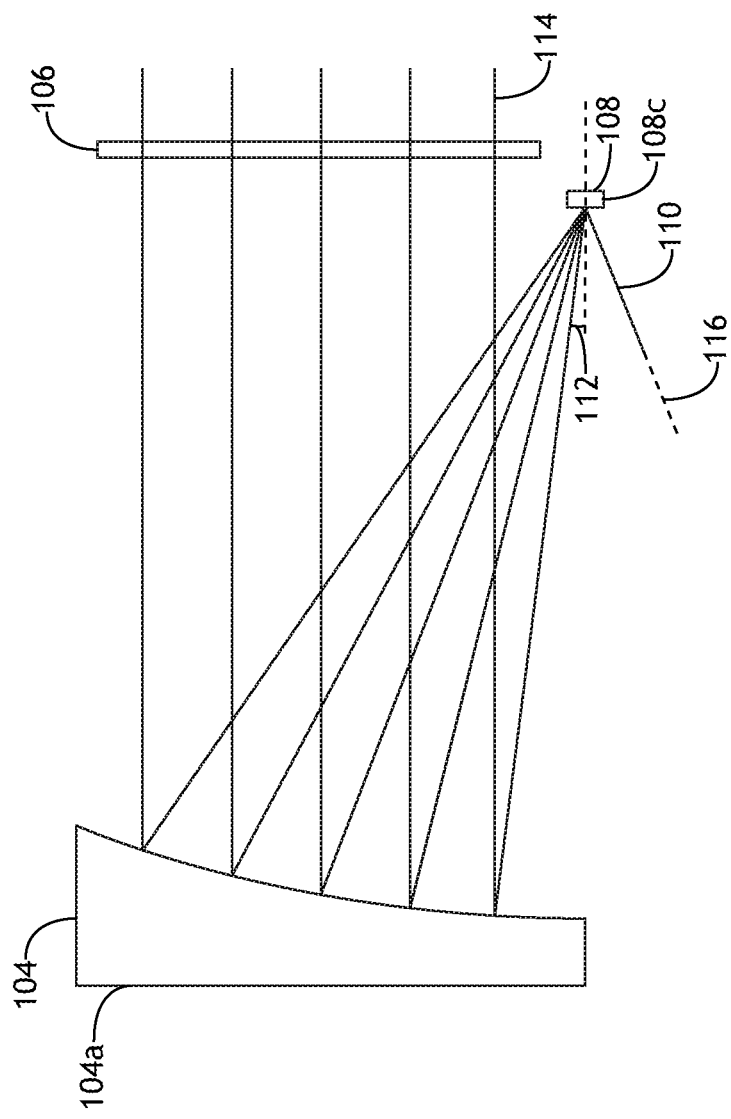
FIG. 1B is a schematic view of a portion of a tunable filter including an input angular scanning component, a linearly-varying filter, and an input focusing optic, in accordance with one or more embodiments of the present disclosure.

Referring now to FIG. 1B, selective tuning with a linearly-varying filter 106 is illustrated in accordance with one or more embodiments of the present disclosure. FIG. 1B is a schematic view of a portion of a tunable filter 102 including an input angular scanning component 108a, a linearly-varying filter 106, and an input focusing optic 104a, in accordance with one or more embodiments of the present disclosure.

In one embodiment, the input angular scanning component 108a is located at a front focal plane of an input focusing optic 104a and the linearly-varying filter 106 is located at a back focal plane of the input focusing optic 104a. In this configuration, distributions of light at the input angular scanning component 108a and the linearly-varying filter 106 are related by a Fourier transform and the spatial position of light on the linearly-varying filter 106 is based on the angle 112 of the light from the input angular scanning component 108a. Accordingly, the properties of a filtered beam 114 (e.g., the input beam 110 filtered by the linearly-varying filter 106) may be tuned by controlling the angle 112 of the input focusing optic 104a. For example, a collimated input beam 110 incident on the input angular scanning component 108a will thus be focused onto the linearly-varying filter 106 by the input focusing optic 104a at a location controlled by the angle 112 of the input angular scanning component 108a. By way of another example, a Gaussian beam positioned with a beam waist on the input angular scanning component 108a may be relayed to have another beam waist on the linearly-varying filter 106.

Figure 1C:
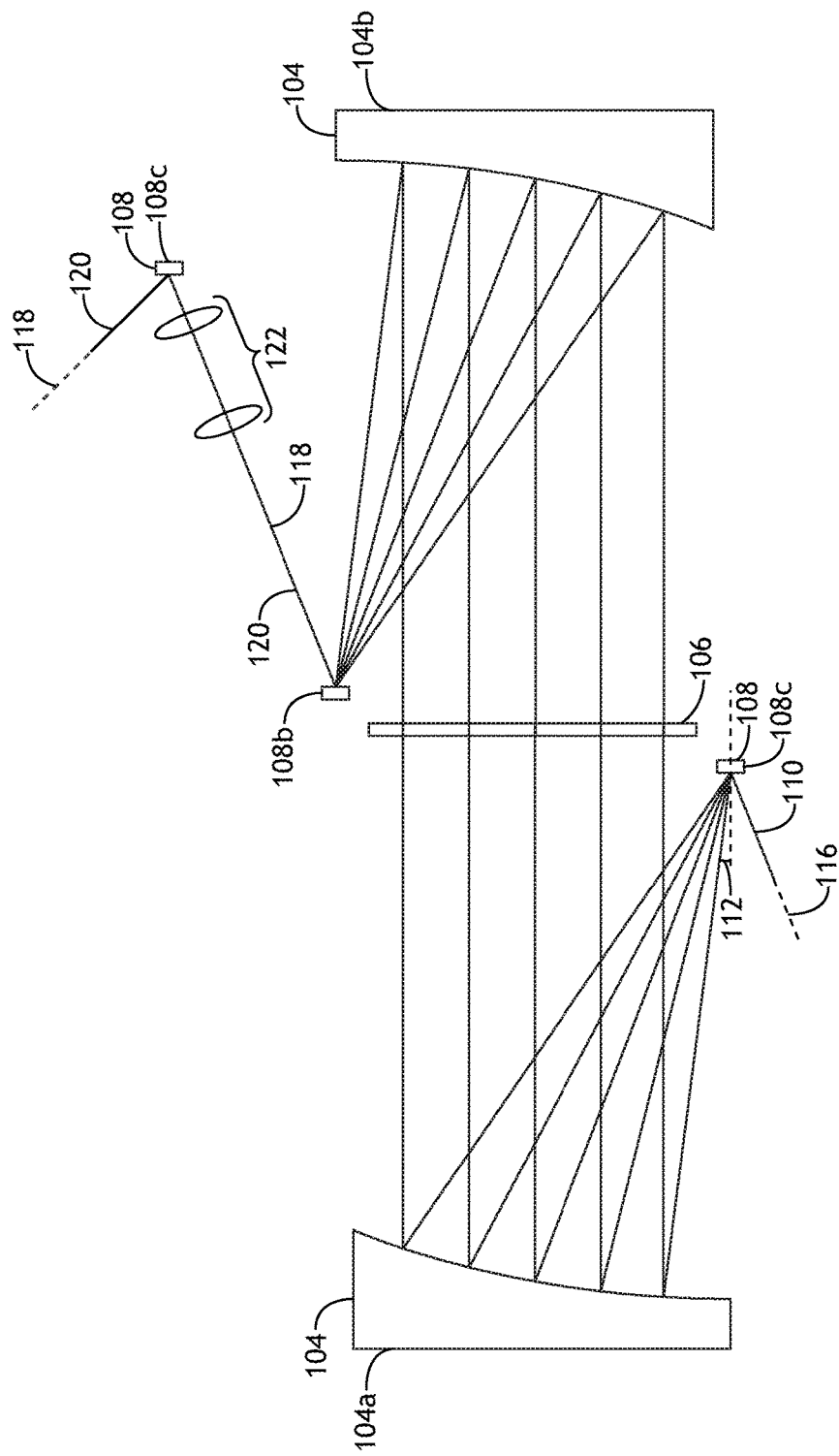
FIG. 1C is a schematic view of a tunable filter illustrating a path of a collimated input beam in accordance with one or more embodiments of the present disclosure.

FIG. 1C is a schematic view of a tunable filter 102 illustrating a path of a collimated input beam 110 in accordance with one or more embodiments of the present disclosure. The paths of an input beam 110 in FIG. 1C are represented as single rays for illustrative purposes. In particular, FIG. 1C illustrates five selectable paths of the input beam 110 from an input path 116 generated by five different angles 112 of the input angular scanning component 108a to interact with the linearly-varying filter 106 at five different locations along the linear filtering direction to provide different properties of the filtered beam 114. Further, FIG. 1C illustrates how the filtered beam 114 may be directed from the output angular scanning component 108b as an output beam 120 along a common output path 118 regardless of the selected angle 112 of the input angular scanning component 108a.

In one embodiment, the tunable filter 102 includes an output focusing optic 104b and an output angular scanning component 108b, where the linearly-varying filter 106 is located at a front focal plane of the output focusing optic 104b and the output angular scanning component 108b is located at a back focal plane of the output focusing optic 104b. In this regard, the output focusing optic 104b may collect the filtered beam 114 emerging from any location of the linearly-varying filter 106 and provide the filtered beam 114 as an output beam 120 along a common output axis (e.g., along a common output direction). Further, this configuration of the tunable filter 102 may correspond to a 4-f system such that the input beam 110 and the filtered beam 114 may both have the same divergence properties. For example, a collimated input beam 110 will exit the tunable filter 102 as a collimated filtered beam 114.

In another embodiment, as illustrated in FIG. 1C, a tunable filter 102 may include a cross-axis angular scanning component 108c. Further, the tunable filter 102 may include one or more relay lenses 122 to relay the output beam 120 from the output angular scanning component 108b to the cross-axis angular scanning component 108c. For example, the cross-axis angular scanning component 108c may provide deflection along an orthogonal angle than provided by the output angular scanning component 108b. In this regard, the output path 118 may generally lie along any direction in three dimensions, which may facilitate accurate position of the output beam 120. For instance, the combination of the output angular scanning component 108b and the cross-axis angular scanning component 108c may provide accurate positioning of the output beam 120 on an output fiber.

Figure 2A:
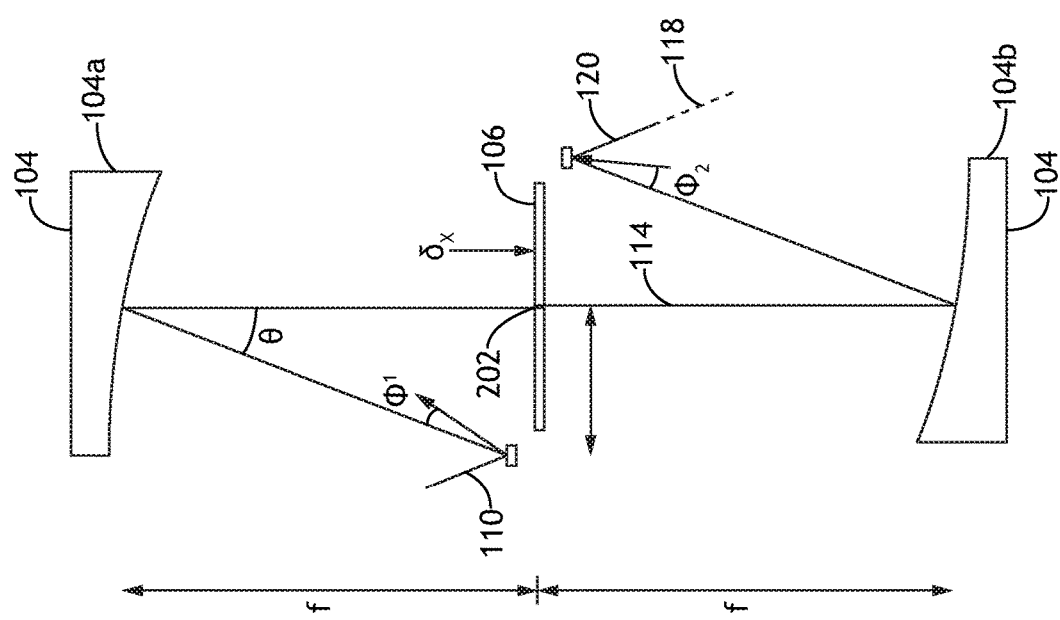
FIG. 2A is a schematic view of a tunable filter illustrating a path of an input beam interacting with a linearly-varying filter at a central position in accordance with one or more embodiments of the present disclosure.
Figure 2B:
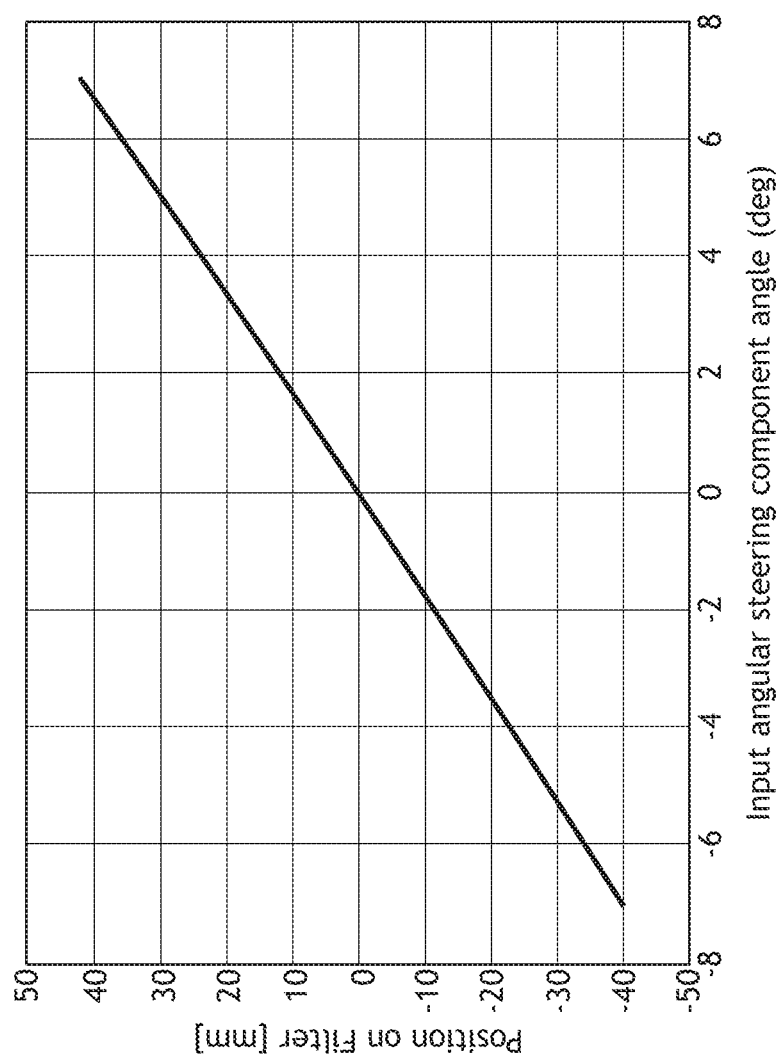
FIG. 2B is a plot illustrating the position of the input beam on the linearly-varying filter ($\delta_x$) along the linear filtering direction as a function of the angle $\phi_1$ of the input angular scanning component in accordance with one or more embodiments of the present disclosure.
Figure 2C:
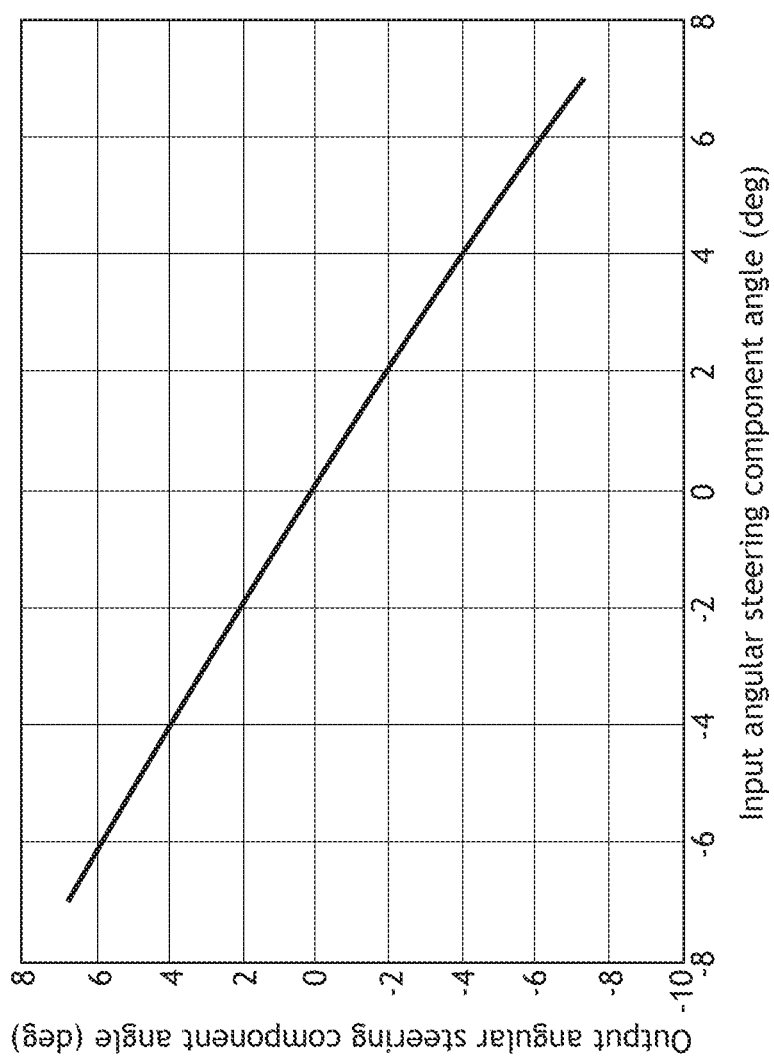
FIG. 2C is a plot illustrating an angle $\phi_2$ of the output angular scanning component as a function of the angle $\phi_1$ of the input angular scanning component from FIG. 2B required to provide the filtered beam as an output beam along a common output path for any selected angle $\phi_1$ of the input angular scanning component in accordance with one or more embodiments of the present disclosure.

Referring now to FIGS. 2A-2C, selecting a position of an input beam 110 on a linearly-varying filter 106 through control of the angular scanning components 108 is described in greater detail in accordance with one or more embodiments of the present disclosure.

FIG. 2A is a schematic view of a tunable filter 102 illustrating a path of an input beam 110 interacting with a linearly-varying filter 106 at a central position 202 in accordance with one or more embodiments of the present disclosure. In FIG. 2A, the position $\delta_x$ of the input beam 110 on the linearly-varying filter 106 is measured with respect to the central position 202 and has a maximum absolute value of D corresponding to a length from the central position 202 to an edge of a usable portion of the linearly-varying filter 106. The angle θ corresponds to an angle between incidence and reflection of the input beam 110 by the input focusing optic 104a corresponding to this central position 202. The angle $\phi_1$ of the input angular scanning component 108a is measured with respect to a nominal angle corresponding to this central position 202.

In one embodiment, the position $\delta_x$ of the input beam 110 on the linearly-varying filter 106 may be characterized as:

$$\delta_x = 2f \, \tan\left[\frac{(\theta + 2\phi_1)}{2}\right] - D, \quad (1)$$

where f is the focal length of the input angular scanning component 108a.

FIG. 2B is a plot illustrating the position of the input beam 110 on the linearly-varying filter 106 ($\delta_x$) along the linear filtering direction as a function of the angle $\phi_1$ of the input angular scanning component 108a in accordance with one or more embodiments of the present disclosure. In particular, the plot in FIG. 2B corresponds to a configuration of the tunable filter 102 in which f=160 mm and D=60 mm. As illustrated in FIG. 2B, the position $\delta_x$ of the input beam 110 on the linearly-varying filter 106 may vary linearly as a function of the angle $\phi_1$ of the input angular scanning component 108a.

FIG. 2C is a plot illustrating an angle $\phi_2$ of the output angular scanning component 108b as a function of the angle $\phi_1$ of the input angular scanning component 108a from FIG. 2B required to provide the filtered beam 114 as an output beam 120 along a common (e.g., fixed) output path 118 for any selected angle $\phi_1$ of the input angular scanning component 108a in accordance with one or more embodiments of the present disclosure.

In one embodiment, the angle $\phi_2$ of the output angular scanning component 108b as a function of the angle $\phi_1$ of the input angular scanning component 108a from FIG. 2B required to provide the filtered beam 114 as an output beam 120 along a common output path 118 for any selected angle $\phi_1$ of the input angular scanning component 108a may be characterized as:

$$\phi_2 = \mathrm{atan}\left[\frac{(D - \delta_x)}{2f}\right] - \frac{\theta}{2}, \quad (2)$$

where the angle $\phi_2$ of the output angular scanning component 108b is measured with respect to a nominal angle corresponding to the central position 202 in FIG. 2A (e.g., $\delta_x=0$). Further, the plot in FIG. 2C is generated based on a configuration of the tunable filter 102 in which the focal length of the output angular scanning component 108b is also equal to f. As illustrated in FIG. 2C, the angle $\phi_2$ of the output angular scanning component 108b required to provide the output beam 120 along a common output path 118 may linearly vary based on the selection of the angle $\phi_1$ of the input angular scanning component 108a.

Figure 3:
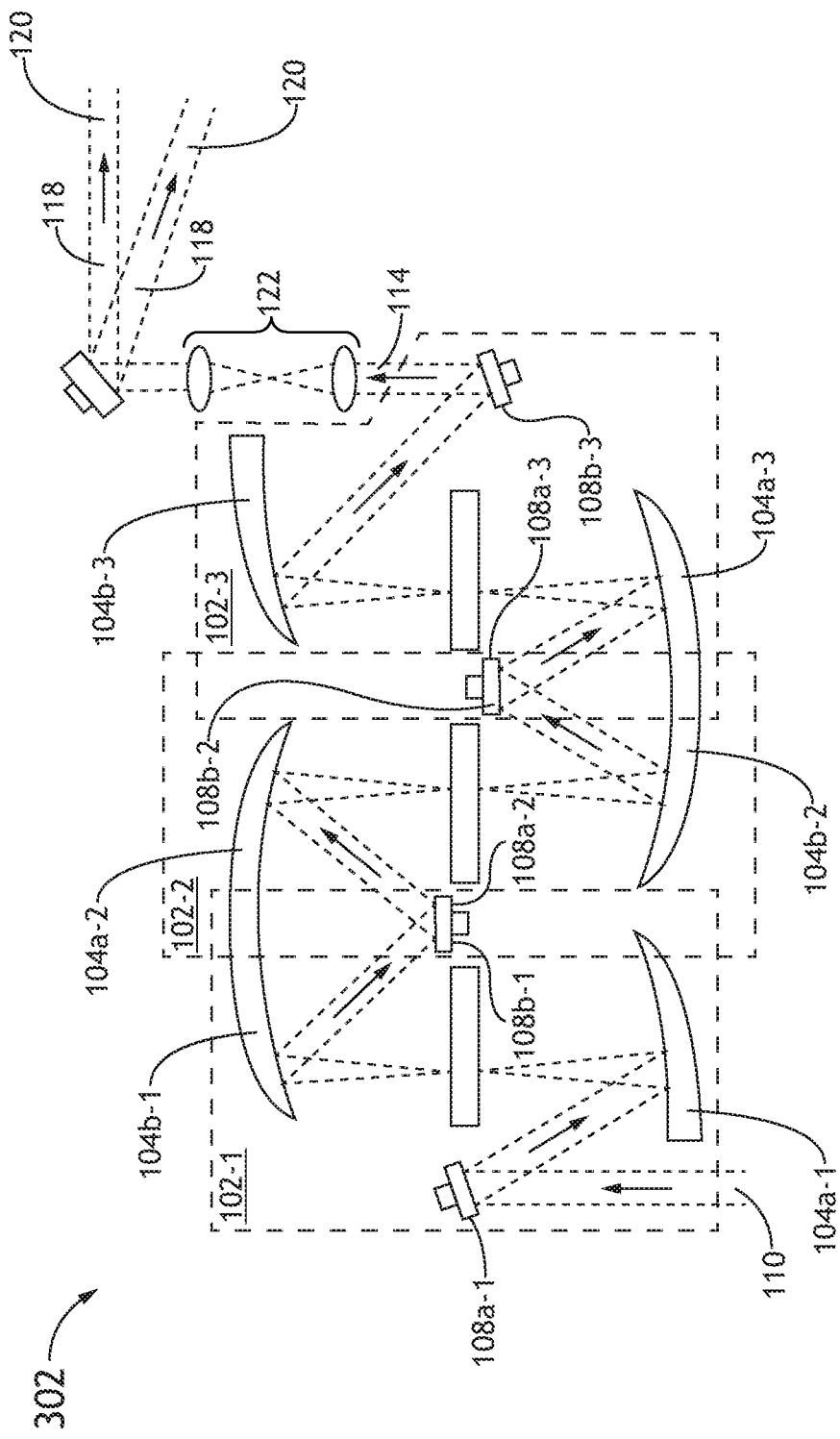
FIG. 3 is a schematic view of multiple tunable filters with different linearly-varying filters for filtering multiple properties of an input beam in accordance with one or more embodiments of the present disclosure.

Referring now to FIG. 3, the combination of multiple tunable filters 102 is described in greater detail in accordance with one or more embodiments of the present disclosure. It is contemplated herein that multiple tunable filters 102 may be combined in series to provide tailored filtering of multiple properties of the input beam. In this configuration, multiple tunable filters 102 may form a filtering sub-system 302, where the input beam 110 to the first of the tunable filters 102 may be an input beam to the filtering sub-system 302, the output beams 120 of all but the last of the tunable filters 102 are input beams 110 to subsequent tunable filters 102, and the output beam 120 of the last of the tunable filters 102 is an output beam 120 of the filtering sub-system 302.

Additionally, the various tunable filters 102 in the filtering sub-system 302 may share, but are not required to share, any components including, but not limited to, focusing optics 104 or angular scanning components 108.

FIG. 3 is a schematic view of multiple tunable filters 102 with different linearly-varying filters 106 for filtering multiple properties of an input beam 110 in accordance with one or more embodiments of the present disclosure. In particular, FIG. 3 illustrates a first tunable filter 102-1 including an input angular scanning component 108a-1 and an output angular scanning component 108b-1, a second tunable filter 102-2 including an input angular scanning component 108a-2 and an output angular scanning component 108b-2, and a third tunable filter 102-3 including an input angular scanning component 108a-3 and an output angular scanning component 108b-3, in series. For example, the linearly-varying filters 106 of the three tunable filters 102 may include, but are not limited to, a neutral density filter, a low-pass spectral filter, and a high-pass spectral filter in any order.

It is contemplated herein that tunable filters 102 may be combined in various ways to filter multiple properties of an input beam 110. In one embodiment, as illustrated in FIG. 3, an output angular scanning component 108b-1 of the first tunable filter 102-1 is also an input angular scanning component 108a-2 of the second tunable filter 102-2. Similarly, an output angular scanning component 108b-2 of the second tunable filter 102-2 is also an input angular scanning component 108a-3 of the third tunable filter 102-3. In this regard, any number of tunable filters 102 may be provided in series to filter the input beam 110. In another embodiment, though not shown, each tunable filter 102 may include a separate input angular scanning component 108a and output angular scanning component 108b.

In one embodiment, as illustrated in FIG. 3, successive tunable filters 102 (e.g., the tunable filters 102-1, 102-2, 102-3 in FIG. 3 may share, but are not required to share, focusing optics 104. For example, as illustrated in FIG. 3, the output focusing optic 104b-1 and the input focusing optic 104a-2 are formed as a common optical element. Similarly, the output focusing optic 104b-2 and the input focusing optic 104a-3 are formed as a common optical element. However, the input focusing optic 104a-1 and the output focusing optic 104b-3 are formed as separate elements. In another embodiment, though not shown, each tunable filter 102 may include separate focusing optics 104.

FIG. 3 further illustrates a cross-axis angular scanning component 108c and relay lenses 122 to provide control over the output path 118 from the filtering sub-system 302. In particular, FIG. 3 illustrates two possible output paths 118.

Referring again to FIG. 1A, a tunable filtering system 100 may include a controller 124, which may be communicatively coupled to any components of the tunable filtering system 100 such as, but not limited to, the angular scanning components 108 (e.g., an input angular scanning component 108a, an output angular scanning component 108b, and/or a cross-axis angular scanning component 108c).

In another embodiment, the controller 124 includes one or more processors 126 configured to execute program instructions maintained on a memory device 128, or memory. The one or more processors 126 of a controller 124 may include any processing element known in the art. In this sense, the one or more processors 126 may include any microprocessor-type device configured to execute algorithms and/or instructions. Further, the memory device 128 may include any storage medium known in the art suitable for storing program instructions executable by the associated one or more processors 126. For example, the memory device 128 may include a non-transitory memory medium. As an additional example, the memory device 128 may include, but is not limited to, a read-only memory (ROM), a random-access memory (RAM), a magnetic or optical memory device (e.g., disk), a magnetic tape, a solid-state drive and the like. It is further noted that memory device 128 may be housed in a common controller housing with the one or more processors 126.

In this regard, the one or more processors 126 of the controller 124 may execute any of the various process steps described throughout the present disclosure. For example, the one or more processors 126 of the controller 124 may control the angles of the angular scanning components 108 (e.g., an input angular scanning component 108a, an output angular scanning component 108b, and/or a cross-axis angular scanning component 108c) to provide tunable filtering of the input beam 110.

In one embodiment, a user interface 130 is communicatively coupled to the controller 124. In one embodiment, the user interface 130 may include, but is not limited to, one or more desktops, laptops, tablets, and the like. In another embodiment, the user interface 130 includes a display used to display data of the tunable filtering system 100 to a user. The display of the user interface 130 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 130 is suitable for implementation in the present disclosure. In another embodiment, a user may input selections and/or instructions responsive to data displayed to the user via a user input device of the user interface 130.

Figure 4A:
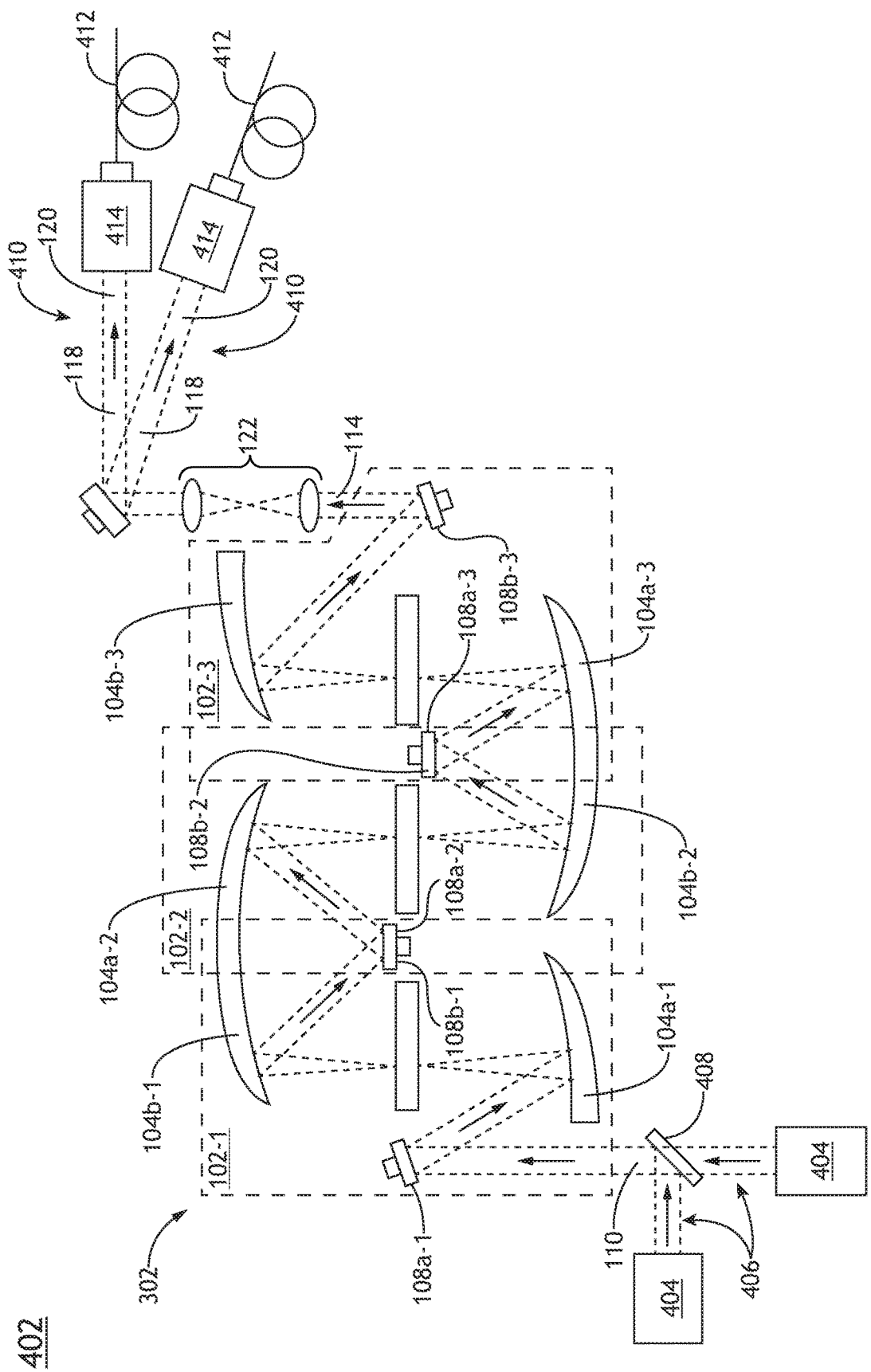
FIG. 4A is a schematic view of an illumination system including two illumination sources providing an input beam along a common input path, in accordance with one or more embodiments of the present disclosure.
Figure 4B:
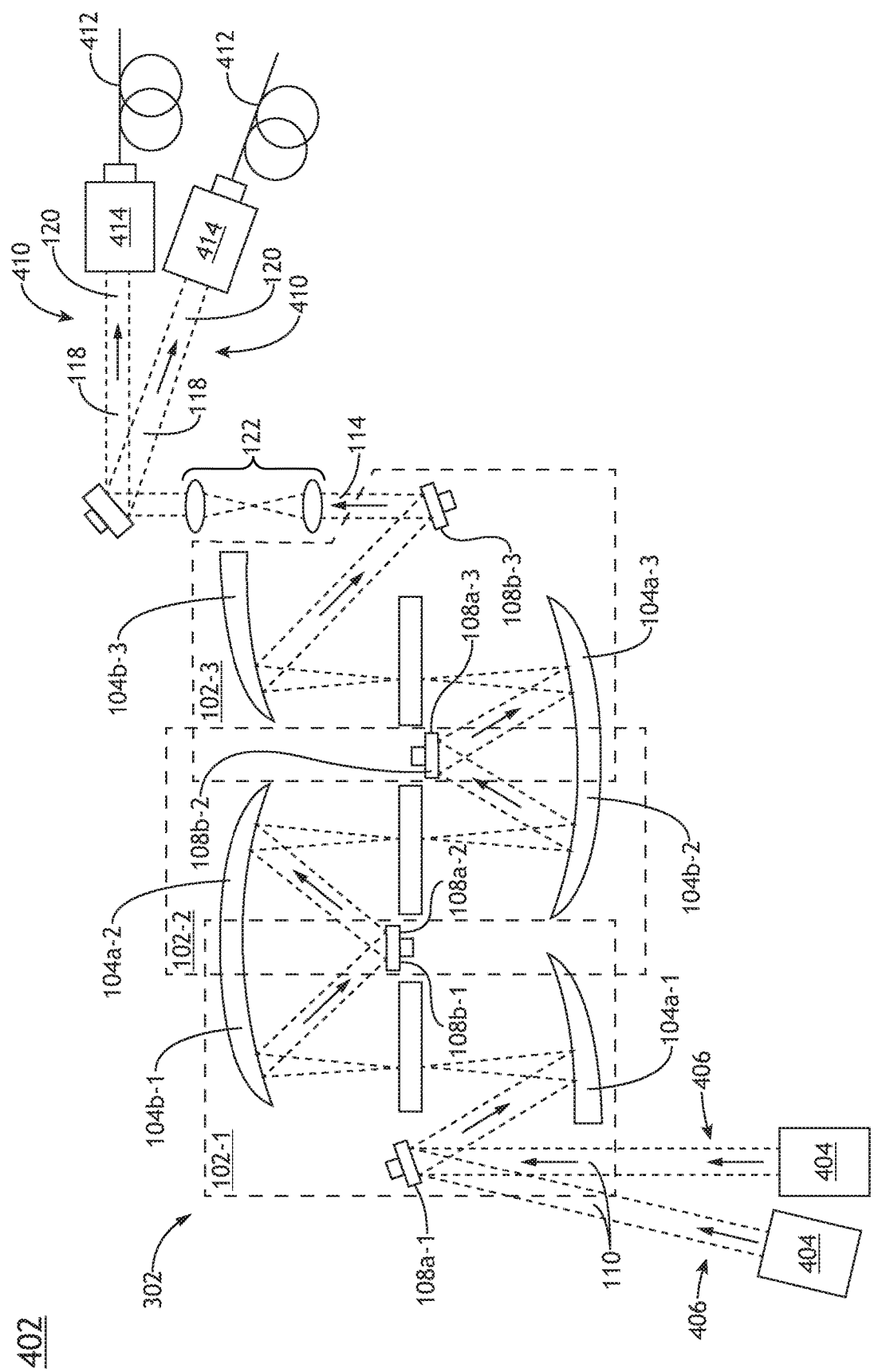
FIG. 4B is a schematic view of an illumination system including illumination sources providing an input beam along a different input paths, in accordance with one or more embodiments of the present disclosure.

Referring now to FIGS. 4A and 4B, an illumination system 402 including at least one tunable filter 102 is described in greater detail in accordance with one or more embodiments of the present disclosure. In particular, the illumination system 402 in FIGS. 4A and 4B include the three tunable filter 102 (e.g., the first tunable filter 102-1, the second tunable filter 102-2, and the third tunable filter 102-3) illustrated in FIG. 3. However, it is to be understood that this particular configuration is provided solely for illustrative purposes and that an illumination system 402 may include any number of tunable filters 102 in any configuration.

FIG. 4A is a schematic view of an illumination system 402 including two illumination sources 404 providing an input beam 110 along a common input path 116, in accordance with one or more embodiments of the present disclosure.

In one embodiment, the illumination system 402 includes one or more illumination sources 404 in one or more illumination channels 406. For example, in FIG. 4A, light from two illumination sources 404 is combined (e.g., using a beam combiner 408) into a common input beam 110 along a common input path 116. In one embodiment, a first illumination source 404 includes a supercontinuum laser source and a second illumination source 404 includes a laser diode (e.g., having wavelengths around 405 nm).

In another embodiment, the illumination system 402 includes one or more output channels 410. In particular, FIG. 4A illustrates two output channels 410, each coupled to output fibers 412 through coupling lenses 414. In this regard, an output beam 120 from one or more tunable filters 102 may be selectively directed into any of the output channels 410. For example, different output channels 410 may be used to provide illumination with different characteristics. In one instance, the controller 124 may selectively direct light with different filtered properties (e.g., generated by different selected positions of an input beam 110 on one or more linearly-varying filters 106 in one or more tunable filters 102) to different output channels 410. In another instance, different output channels 410 may be configured to provide illumination (e.g., of a sample) at different incidence angles, polarizations, or the like.

FIG. 4A further illustrates a cross-axis angular scanning component 108*c* and a relay lenses 122 as described with respect to FIG. 1C. In this regard, the combination of the output angular scanning component 108*b*-3 and the cross-axis angular scanning component 108*c* may provide three-dimensional control over the output path 118 of the output beam 120.

Referring now to FIG. 4B, the use of a tunable filter 102 (or a series of tunable filters 102) to provide selection of illumination channels 406 and/or output channels 410 is described in greater detail in accordance with one or more embodiments of the present disclosure.

FIG. 4B is a schematic view of an illumination system 402 including illumination sources 404 providing an input beam 110 along a different input paths 116, in accordance with one or more embodiments of the present disclosure.

It one embodiment, any combination of the angular scanning components 108 may be adjusted to select a particular illumination source 404. For example, an angle of an input angular scanning component 108*a* (e.g., input angular scanning component 108*a*-1 in FIG. 4B) may be adjusted to direct light from any selected illumination source 404 to a selected position on a linearly-varying filter 106 to provide tunable filtering of the input beam 110 from the selected illumination source 404. By way of another example, an output angular scanning component 108*b* (e.g., output angular scanning component 108*b*-3 in FIG. 4B) and/or a cross-axis angular scanning component 108*c* may be adjusted to select an illumination source 404 by directing light from the selected illumination source 404 along a desired output path 118. In this regard, it is contemplated herein that the tunable filter 102 is symmetric and any combination of an input angular scanning component 108*a* and an output angular scanning component 108*b* may select an illumination source 404. Further, it is to be understood that any of the angular scanning components 108 may be adjusted to provide selection of an illumination source 404.

In another embodiment, any combination of the angular scanning components 108 may be adjusted to provide the output beam 120 from any illumination source 404 to a selected output channel 410. It is contemplated herein that the output channel 410 may be selected using the same concepts as described above for selection of the illumination source 404, but in reverse. For example, any combination of a input angular scanning component 108*a* (e.g., the input angular scanning component 108*a*-1 in FIG. 4B) and a output angular scanning component 108*b* (e.g., the output angular scanning component 108*b*-3 in FIG. 4B) may be adjusted to provide an output beam 120 to from any selected illumination source 404 to any selected output channel 410.

In another embodiment, a tunable filter 102 (or a series of tunable filters 102) may be used to mitigate speckle. For example, speckle may be present when illuminating a sample with coherent light (e.g., a coherent output beam 120 from a tunable filter 102 as disclosed herein) due to surface roughness of the sample. In one embodiment, the output angular scanning component 108*b* and/or a cross-axis angular scanning component 108*c* of a tunable filter 102 may be controlled to modulate an output angle of the output beam 120 along an output path 118 to mitigate speckle. For example, the output angular scanning component 108*b* and/or a cross-axis angular scanning component 108*c* may rapidly oscillate the output beam 120 along any pattern (e.g., randomized, scanned, or the like) within a selected range of output angles to introduce minor fluctuations of the output path 118. If the timescale of the oscillations is shorter than a measurement timescale (e.g., an exposure time), the impacts of the speckle may be averaged out by the oscillations of the output beam 120. Further, it is contemplated herein that mitigating speckle through the oscillation of the output angular scanning component 108*b* and/or a cross-axis angular scanning component 108*c* may facilitate faster oscillations than typical speckle-reduction techniques such as a rotating diffuser plate or mechanically vibrating an illumination fiber. Accordingly, a tunable filter 102 as described herein may enable shorter measurement timescales (e.g., an exposure times) than typical speckle-reduction techniques, which may in turn enable increased measurement throughput without sacrificing performance.

In one embodiment, the output angular scanning component 108*b* and/or a cross-axis angular scanning component 108*c* of a tunable filter 102 may rapidly oscillate the output beam 120 on an input face of an optical fiber. In this way, modulating the launch conditions of a spatially-coherent output beam 120 on an entrance of the optical fiber (e.g., a multi-mode optical fiber) may modulate the near-field and far-field speckle distributions of the light exiting the fiber. Provided that the oscillations are within a collection numerical aperture (NA) of the fiber, the full power of the output beam 120 may be captured. For example, in FIG. 4B, the output angular scanning component 108*b*-3 and/or the cross-axis angular scanning component 108*c* may be configured (e.g., using the controller 124) to oscillate the output beam 120 an input faces on any of the output fibers 412.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A tunable filter comprising:
   an input focusing optic;
   an output focusing optic;
   a linearly-varying filter, wherein filtering parameters of the linearly-varying filter differ based on spatial position on the linearly-varying filter, wherein the linearly-varying filter is located at a back focal plane of the input focusing optic and a front focal plane of the output focusing optic;
   an input angular scanning component formed as a first mirror with an adjustable angle and located at a front focal plane of the input focusing optic, wherein the input focusing optic receives an input beam from the input angular scanning component and directs the input beam to the linearly-varying filter, wherein a position of the input beam on the linearly-varying filter is selectable based on an angle of the input angular scanning component; and
   an output angular scanning component formed as a second mirror with an adjustable angle and located at a back focal plane of the output focusing optic, wherein the output focusing optic receives the input beam from the linearly-varying filter as a filtered beam and directs the filtered beam to the output angular scanning component, wherein the output angular scanning component provides the filtered beam as an output beam along an output path selectable based on an angle of the output angular scanning component.

2. The tunable filter of claim 1, further comprising:
   a controller communicatively coupled to the input angular scanning component and the output angular scanning component, the controller including one or more processors configured to execute program instructions causing the one or more processors to:
   select the angle of the input angular scanning component to select the position of the input beam on the linearly-varying filter.

3. The tunable filter of claim 2, wherein the one or more processors are further configured to execute program instructions causing the one or more processors to: select an angle of the output angular scanning component based on the angle of the input angular scanning component to direct the output beam along a fixed output path.

4. The tunable filter of claim 2, wherein the one or more processors are further configured to execute program instructions causing the one or more processors to:
   select an angle of at least one of the output angular scanning component or the input angular scanning component to direct the output beam to a selected output channel of two or more output channels.

5. The tunable filter of claim 2, wherein the one or more processors are further configured to execute program instructions causing the one or more processors to:
   select an angle of at least one of the output angular scanning component or the input angular scanning component to receive the input beam from a selected illumination source of two or more illumination sources.

6. The tunable filter of claim 1, further comprising:
   a cross-axis angular scanning component to receive the output beam from the output angular scanning component, wherein a scanning plane of the cross-axis angular scanning component is orthogonal to a scanning plane of the output angular scanning component, wherein the output beam may be directed along any output angle by controlling the output angular scanning component and the cross-axis angular scanning component.

7. The tunable filter of claim 6, further comprising:
   a controller communicatively coupled to the input angular scanning component and the output angular scanning component, the controller including one or more processors configured to execute program instructions causing the one or more processors to:
   modulate the output angular scanning component and the cross-axis angular scanning component to modulate the output angle to mitigate speckle.

8. The tunable filter of claim 7, further comprising:
   a coupling lens to direct the output beam from the cross-axis angular scanning component to an input face of an optical fiber, wherein modulating the output angular scanning component and the cross-axis angular scanning component to modulate the output angle modulates at least one of a position or an angle of the output beam on the input face of the optical fiber.

9. The tunable filter of claim 1, wherein at least one of the input focusing optic or the output focusing optic comprises:
   at least one of a parabolic mirror, an elliptical mirror, or a refractive scan lens.

10. The tunable filter of claim 1, wherein the linearly-varying filter comprises:
    a linearly-varying spectral filter.

11. The tunable filter of claim 10, wherein the linearly-varying spectral filter comprises:
    at least one of a long-pass filter or a short-pass filter, wherein a cut-off wavelength varies based the position on the linearly-varying spectral filter.

12. The tunable filter of claim 10, wherein the linearly-varying spectral filter comprises:
    a band-pass filter, wherein at least one of a central passed wavelength or a spectral pass width varies based the position on the linearly-varying spectral filter.

13. The tunable filter of claim 1, wherein the linearly-varying filter comprises:

a linearly-varying neutral density filter, wherein a transmissivity varies based the position on the linearly-varying neutral density filter.

14. The tunable filter of claim 1, wherein the linearly-varying filter comprises:
a linearly-varying polarizer, wherein a passed polarization varies based the position on the linearly-varying polarizer.

15. The tunable filter of claim 1, wherein at least one of the input angular scanning component or the output angular scanning component comprises:
at least one of a galvanometer, an acousto-optic deflector, an electro-optic deflector, a polygon scanner, or a micro-electro-mechanical systems (MEMS) deflector.

16. A system comprising:
two or more tunable filters, wherein a tunable filter of the two or more tunable filters comprises:
an input focusing optic;
an output focusing optic;
a linearly-varying filter, wherein filtering parameters of the linearly-varying filter differ based on spatial position on the linearly-varying filter, wherein the linearly-varying filter is located at a back focal plane of the input focusing optic and a front focal plane of the output focusing optic;
an input angular scanning component formed as a first mirror with an adjustable angle and located at a front focal plane of the input focusing optic, wherein the input angular scanning component receives the input beam from the input focusing optic and directs the input beam to the linearly-varying filter, wherein a position of the input beam on the linearly-varying filter is selectable based on an angle of the input angular scanning component; and
an output angular scanning component formed as a second mirror with an adjustable angle and located at a back focal plane of the output focusing optic, wherein the output focusing optic receives the input beam from the linearly-varying filter as a filtered beam and directs the filtered beam to the output angular scanning component, wherein the output beam of all but a last of the two or more tunable filters is an input beam of a following tunable filter of the two or more tunable filters.

17. An illumination system comprising:
an illumination source configured to generate an input beam; and
a filtering sub-system including two or more tunable filters, wherein a tunable filter of the two or more tunable filters comprises:
an input focusing optic;
an output focusing optic;
a linearly-varying filter, wherein filtering parameters of the linearly-varying filter differ based on spatial position on the linearly-varying filter, wherein the linearly-varying filter is located at a back focal plane of the input focusing optic and a front focal plane of the output focusing optic;
an input angular scanning component formed as a first mirror with an adjustable angle and located at a front focal plane of the input focusing optic, wherein the input focusing optic receives the input beam from the input angular scanning component and directs the input beam to the linearly-varying filter, wherein a position of the input beam on the linearly-varying filter is selectable based on an angle of the input angular scanning component; and
an output angular scanning component formed as a second mirror with an adjustable angle and located at a back focal plane of the output focusing optic, wherein the output focusing optic receives the input beam from the linearly-varying filter as a filtered beam and directs the filtered beam to the output angular scanning component; and
wherein the input angular scanning component of a first of the two or more tunable filters is an input angular scanning component of the filtering sub-system and receives illumination from the illumination source as the input beam, wherein the output beam of all but a last of the two or more tunable filters is an input beam of a following tunable filter of the two or more tunable filters, wherein the output angular scanning component of the last of the two or more tunable filters is an output angular scanning component of the filtering sub-system.

18. The illumination system of claim 17, further comprising:
a controller communicatively coupled to the two or more tunable filters, the controller including one or more processors configured to execute program instructions causing the one or more processors to:
select the angle of the input angular scanning component of the filtering sub-system to select the position of the input beam on the linearly-varying filter.

19. The illumination system of claim 18, wherein the one or more processors are further configured to execute program instructions causing the one or more processors to:
select an angle of the output angular scanning component of the filtering sub-system based on the angle of the input angular scanning component to direct the output beam along a fixed output path.

20. The illumination system of claim 18, wherein the one or more processors are further configured to execute program instructions causing the one or more processors to:
select an angle of at least one of the output angular scanning component of the filtering sub-system or the input angular scanning component of the filtering sub-system to direct the output beam to a selected output channel of two or more output channels.

21. The illumination system of claim 18, wherein the illumination source is a first of two or more illumination sources, wherein the one or more processors are further configured to execute program instructions causing the one or more processors to:
select an angle of at least one of the output angular scanning component of the filtering sub-system or the input angular scanning component of the filtering sub-system to receive light from a selected illumination source of two or more illumination sources as the input beam to the filtering sub-system.

22. The illumination system of claim 18, further comprising:
a cross-axis angular scanning component to receive the output beam of the filtering sub-system from the output angular scanning component of the filtering sub-system, wherein a scanning plane of the cross-axis angular scanning component is orthogonal to a scanning plane of the output angular scanning component of the filtering sub-system, wherein the output beam may be directed along any output angle by controlling the output angular scanning component of the filtering sub-system and the cross-axis angular scanning component.

23. The illumination system of claim 22, further comprising:
a controller communicatively coupled to the input angular scanning component and the output angular scanning component, the controller including one or more processors configured to execute program instructions causing the one or more processors to:
modulate the output angular scanning component of the filtering sub-system and the cross-axis angular scanning component to modulate the output angle to mitigate speckle.

24. The illumination system of claim 23, further comprising:
a coupling lens to direct the output beam from the cross-axis angular scanning component to an input face of an optical fiber, wherein modulating the output angular scanning component of the filtering sub-system and the cross-axis angular scanning component to modulate the output angle modulates at least one of a position or an angle of the output beam of the filtering sub-system on the input face of the optical fiber.

25. The illumination system of claim 17, wherein at least one of the input focusing optic or the output focusing optic of any of the two or more tunable filters comprises:
at least one of a parabolic mirror, an elliptical mirror, or a refractive scan lens.

26. The illumination system of claim 17, wherein the linearly-varying filter of any of the two or more tunable filters comprises:
at least one of a linearly-varying spectral filter, a linearly-varying neutral density filter, a linearly-varying polarizer, or a linearly-varying waveplate.

27. The illumination system of claim 17, wherein at least one of the input angular scanning component or the output angular scanning component of any of the two or more tunable filters comprises:
at least one of a galvanometer, an acousto-optic deflector, an electro-optic deflector, a polygon scanner, or a micro-electro-mechanical systems (MEMS) deflector.

28. The illumination system of claim 17, wherein the illumination source comprises:
at least one of a supercontinuum laser source, a laser-driven plasma source, or a laser diode.

29. The illumination system of claim 17, wherein the two or more tunable filters comprise:
a first tunable filter, wherein the linearly-varying filter of the first tunable filter includes a neutral density filter;
a second tunable filter, wherein the linearly-varying filter of the second tunable filter includes a low-pass spectral filter; and
a third tunable filter, wherein the linearly-varying filter of the third tunable filter includes a high-pass spectral filter.

30. The illumination system of claim 29, wherein the illumination source comprises:
a supercontinuum laser source.

31. The illumination system of claim 17, wherein at least one of the input focusing optic or the output focusing optic of any of the two or more tunable filters comprises:
a parabolic mirror.

32. The illumination system of claim 17, wherein at least one of the input angular scanning component or the output angular scanning component of any of the two or more tunable filters comprises:
a galvanometer.

* * * * *